United States Patent
Rueby

(10) Patent No.: US 8,400,670 B2
(45) Date of Patent: Mar. 19, 2013

(54) IMAGE DOWN-SAMPLING WITH FINE DETAIL ENHANCEMENT

(75) Inventor: Christopher Rueby, North Chili, NY (US)

(73) Assignee: Eastman Kodak Company, Rochester, NY (US)

( * ) Notice: Subject to any disclaimer, the term of this patent is extended or adjusted under 35 U.S.C. 154(b) by 645 days.

(21) Appl. No.: 12/618,949

(22) Filed: Nov. 16, 2009

(65) Prior Publication Data

US 2011/0116107 A1 May 19, 2011

(51) Int. Cl.
| | |
|---|---|
| G06K 15/02 | (2006.01) |
| H04N 1/46 | (2006.01) |
| H04N 1/407 | (2006.01) |
| G06K 9/42 | (2006.01) |
| G06K 9/44 | (2006.01) |
| G06K 9/40 | (2006.01) |

(52) U.S. Cl. ........ 358/1.2; 358/3.27; 358/528; 358/532; 358/451; 382/256; 382/258; 382/266; 382/286; 382/299

(58) Field of Classification Search ........................ None
See application file for complete search history.

(56) References Cited

U.S. PATENT DOCUMENTS

| | | | |
|---|---|---|---|
| 5,555,557 A * | 9/1996 | Mailloux | 382/299 |
| 5,995,682 A | 11/1999 | Pawlick et al. | |
| 6,816,166 B2 | 11/2004 | Shimizu et al. | |
| 6,832,009 B1 | 12/2004 | Shezaf et al. | |
| 7,046,390 B2 | 5/2006 | Atkins | |
| 7,149,369 B2 | 12/2006 | Atkins | |
| 7,200,278 B2 | 4/2007 | Long et al. | |
| 7,865,040 B1 * | 1/2011 | Georgiev | 382/298 |
| 2002/0181797 A1 * | 12/2002 | Young | 382/260 |
| 2003/0206231 A1 * | 11/2003 | Chen et al. | 348/207.99 |
| 2007/0024638 A1 * | 2/2007 | Hoppe et al. | 345/606 |
| 2007/0172152 A1 | 7/2007 | Altunbasak et al. | |
| 2009/0225335 A1 * | 9/2009 | Kubo et al. | 358/1.9 |
| 2010/0008596 A1 * | 1/2010 | Kawabe | 382/266 |

* cited by examiner

*Primary Examiner* — Satwant Singh
(74) *Attorney, Agent, or Firm* — Kevin E. Spaulding

(57) ABSTRACT

A method for resizing an input digital image having input pixel values to produce an output digital image having output pixel values, wherein the output digital image has a lower resolution and wherein single pixel width details in the input digital image are preserved, the method being performed by a processor and comprising: determining an output pixel value for the output digital image by interpolating within a corresponding neighborhood of image pixels in the input digital image; detecting whether the input digital image contains a fine detail within the corresponding neighborhood of image pixels; adjusting the output pixel value when a fine detail is detected; and repeating steps a)-c) for a plurality of output pixels.

24 Claims, 10 Drawing Sheets

| 255 | 255 | 255 | 255 | 255 | 255 | 0 | 255 | 255 | 255 | 255 | 255 |
|---|---|---|---|---|---|---|---|---|---|---|---|
| 255 | 255 | 255 | 255 | 255 | 255 | 0 | 255 | 255 | 255 | 255 | 255 |
| 255 | 255 | 255 | 255 | 255 | 255 | 0 | 255 | 255 | 255 | 255 | 255 |
| 255 | 255 | 255 | 255 | 255 | 255 | 0 | 255 | 255 | 255 | 255 | 255 |
| 255 | 255 | 255 | 255 | 255 | 255 | 0 | 255 | 255 | 255 | 255 | 255 |
| 0 | 0 | 0 | 0 | 0 | 0 | 0 | 0 | 0 | 0 | 0 | 0 |
| 255 | 255 | 255 | 255 | 255 | 255 | 0 | 255 | 255 | 255 | 255 | 255 |
| 255 | 255 | 255 | 255 | 255 | 255 | 0 | 255 | 255 | 255 | 255 | 255 |
| 255 | 255 | 255 | 255 | 255 | 255 | 0 | 255 | 255 | 255 | 255 | 255 |
| 255 | 255 | 255 | 255 | 255 | 255 | 0 | 255 | 255 | 255 | 255 | 255 |
| 255 | 255 | 255 | 255 | 255 | 255 | 0 | 255 | 255 | 255 | 255 | 255 |

| 255 | 255 | 255 | 121 | 186 | 255 | 255 |
|-----|-----|-----|-----|-----|-----|-----|
| 212 | 255 | 255 | 121 | 186 | 255 | 255 |
|     | 212 | 212 | 92  | 150 | 212 | 212 |
|     | 105 | 105 | 21  | 62  | 105 | 105 |
|     | 255 | 255 | 121 | 186 | 255 | 255 |
|     | 255 | 255 | 121 | 186 | 255 | 255 |

| 255 | 255 | 255 | 255 | 121 | 121 | 186 | 186 | 255 | 255 | 255 | 255 |
|-----|-----|-----|-----|-----|-----|-----|-----|-----|-----|-----|-----|
| 255 | 255 | 255 | 255 | 121 | 121 | 186 | 186 | 255 | 255 | 255 | 255 |
| 255 | 255 | 255 | 255 | 121 | 121 | 186 | 186 | 255 | 255 | 255 | 255 |
| 255 | 255 | 255 | 255 | 121 | 121 | 186 | 186 | 255 | 255 | 255 | 255 |
| 212 | 212 | 212 | 212 | 92  | 92  | 150 | 150 | 212 | 212 | 212 | 212 |
| 212 | 212 | 212 | 212 | 92  | 92  | 150 | 150 | 212 | 212 | 212 | 212 |
| 105 | 105 | 105 | 105 | 21  | 21  | 62  | 62  | 105 | 105 | 105 | 105 |
| 105 | 105 | 105 | 105 | 21  | 21  | 62  | 62  | 105 | 105 | 105 | 105 |
| 255 | 255 | 255 | 255 | 121 | 121 | 186 | 186 | 255 | 255 | 255 | 255 |
| 255 | 255 | 255 | 255 | 121 | 121 | 186 | 186 | 255 | 255 | 255 | 255 |
| 255 | 255 | 255 | 255 | 121 | 121 | 186 | 186 | 255 | 255 | 255 | 255 |
| 255 | 255 | 255 | 255 | 121 | 121 | 186 | 186 | 255 | 255 | 255 | 255 |

| 255 | 255 | 212 | 0 | 255 | 255 |
|---|---|---|---|---|---|
| 255 | 255 | 212 | 0 | 255 | 255 |
| 0 | 0 | 0 | 0 | 0 | 0 |
| 212 | 212 | 176 | 0 | 212 | 212 |
| 255 | 255 | 212 | 0 | 255 | 255 |
| 255 | 255 | 212 | 0 | 255 | 255 |

| 255 | 255 | 255 | 255 | 0 | 0 | 212 | 212 | 255 | 255 | 255 | 255 |
|---|---|---|---|---|---|---|---|---|---|---|---|
| 255 | 255 | 255 | 255 | 0 | 0 | 212 | 212 | 255 | 255 | 255 | 255 |
| 255 | 255 | 255 | 255 | 0 | 0 | 212 | 212 | 255 | 255 | 255 | 255 |
| 255 | 255 | 255 | 255 | 0 | 0 | 212 | 212 | 255 | 255 | 255 | 255 |
| 212 | 212 | 212 | 212 | 0 | 0 | 176 | 176 | 212 | 212 | 212 | 212 |
| 212 | 212 | 212 | 212 | 0 | 0 | 176 | 176 | 212 | 212 | 212 | 212 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 255 | 255 | 255 | 255 | 0 | 0 | 212 | 212 | 255 | 255 | 255 | 255 |
| 255 | 255 | 255 | 255 | 0 | 0 | 212 | 212 | 255 | 255 | 255 | 255 |
| 255 | 255 | 255 | 255 | 0 | 0 | 212 | 212 | 255 | 255 | 255 | 255 |
| 255 | 255 | 255 | 255 | 0 | 0 | 212 | 212 | 255 | 255 | 255 | 255 |

804

IMAGE DOWN-SAMPLING WITH FINE DETAIL ENHANCEMENT

FIELD OF THE INVENTION

This invention pertains to the field of image resizing, and more particularly to a method for image down-sampling wherein single pixel width details in the input digital image are preserved.

BACKGROUND OF THE INVENTION

Image resizing is an operation that is used in many different digital image processing chains. Often digital output devices such as printers and softcopy displays require digital images of a particular image resolution. When it is desired to display digital images having a different resolution, it is necessary to use an image resizing operation to produce an image of the desired resolution. For example, a particular printer may be designed to print 600 dpi images. To print a 200 dpi input image, it would be necessary to resize the image by up-sampling the image by a factor of 3×. In other cases, it may be necessary to down-sample the image when the input image has a higher resolution than the printer requires.

Another application where image resizing can be required is when images need to be stored in a limited amount of memory, or sent across a communication link having a limited amount of bandwidth. In this case, high resolution images are down-sampled to create smaller images having a lower resolution.

FIG. 1 shows an example of a system 100 for printing images where image resizing is typically applied. The system 100 has two components: a host device 101, and a printer 102, connected by a communication link 110. The host device 101 could, for example, be a personal computer connected to the printer using a USB cable. Alternately, the host device 101 could be some other device such as a digital camera that can communicate directly with the printer 102 using a wireless connection, such as a wireless connection using the well-known Bluetooth protocol.

The host device 101 performs host device processing 106 to process an input digital image 104 to produce a processed digital image 108. For the example where the host device 101 is a personal computer, the host device processing 106 would typically occur in a printer driver. Conventionally, printer drivers will receive the input digital image 104 from a host application using standard operating system interfaces. Generally, the printer driver would receive input digital images 104 having a specific image resolution (e.g., 600 dpi). The input digital image 104 may be a photographic image, or alternately may be some other form of digital image, such as documents containing text and graphics.

The host device processing 106 can perform a variety of different image processing operations depending on the requirements of the particular printer 102. Examples of such image processing operations would include color correction, sharpening, halftoning and resizing. Typically, the printer 102 may require that the host device 101 supply digital image data of a particular resolution. The required resolution may correspond to the native resolution of the printer 102, or may correspond to a resolution that will enable the printer to receive the image data at a sufficient speed to support the printer's optimum throughput. For example, if the printer is specified to print a certain number of pages per minute in a draft printing mode, the image data must be supplied to the printer at that rate. In this case, it may be necessary to limit the resolution of the image data being sent to the printer in order to achieve the required speed, particularly when using low bandwidth communication links such as wireless links. Therefore, it will often be necessary for the host device processing 106 to down-sample the image using a resizing operation.

The printer 102 receives the processed digital image 108 from the host device 101 via the communication link 110. The printer 102 applies printer processing 112 to produce a print-ready digital image 114. The printer processing could include a wide variety of image processing operations including color correction, resizing, sharpening, halftoning, and swath generation. The print-ready digital image 114 is then passed to a printer engine 116 to produce the output printed image 118.

Consider the case where the host device 101 receives an input digital image 104 having a 600 dpi resolution, but the printer 102 requires that the host device 101 supply a processed digital image 108 having a 300 dpi resolution. In this case, the host device processing must apply a resizing operation that applies a 2× down-sampling of the image data. The down-sampling operation can sometimes result in a loss of image quality. This is particularly true when the input digital image 104 contains fine details, such as single pixel width lines.

FIG. 2A shows an example of a grayscale input digital image 120 having a pair of crossed single pixel width lines. The input digital image 120 has a background comprised of white pixels 122 having an 8-bit code value of 255. The single pixel width lines are shown as black pixels 124 having an 8-bit code value of 0.

One common algorithm that is used in many resizing operations is cubic interpolation. With this method, interpolated pixels are determined by performing a weighted average of pixel values for a neighborhood of input pixels. Some resizing algorithms employ a bicubic interpolation algorithm which considers a 2-dimensional neighborhood of pixels. In other implementations a 1-dimensional cubic interpolation algorithm is first applied to the image rows to resize the digital image in one direction, and then subsequently applied to the image columns to resize the digital image in the other direction.

FIG. 2B illustrates the use of a cubic interpolation algorithm to apply a 2× down-sampling operation to one row of image pixels 130 from the input digital image 120 shown in FIG. 2A. To compute a particular output pixel value 136B, the cubic interpolation algorithm computes a weighted summation of the input pixels values for a pixel neighborhood 131. A set of weighting factors 132 is used to weight the pixel values in the pixel neighborhood 131 to produce weighted pixel values 134. The weighted pixel values 134 are then added together to produce the corresponding output pixel value 136B. In FIGS. 2C-2E the same cubic interpolation algorithm is applied to produce output pixel values 136C, 136D and 136E using corresponding pixel neighborhoods 131.

FIG. 2F illustrates a down-sampled digital image 140 determined by applying the cubic interpolation algorithm just described to each row and then to each column of the input digital image 120. It can be seen that the pixel values for down-sampled line pixels 141 are no longer black, but rather correspond to light gray pixel values. This represents a significant loss of image quality relative to the input digital image 120, because the visibility of the single pixel width details will be substantially reduced.

Consider the case where this approach is used by the host device processing 106 in the system 100 of FIG. 1 to produce a 300 dpi processed digital image 108, which is passed to the printer 102 via the communication link 110. If the printer engine 116 has a native resolution of 600 dpi, the printer processing 112 must then apply a resizing algorithm to perform a 2× up-sampling operation. One common resizing algorithm that is used for up-sampling operations is pixel-replication (also known as nearest-neighbor interpolation). FIG. 2G shows a pixel-replicated digital image 142 produced by applying pixel replication to the down-sampled digital image 140. Comparing the pixel-replicated digital image 142 to the input digital image 120 reveals that the pixel-replicated line pixels 143 have a much lower density than the original black line in the input digital image 120. Thus the printed image 118 will suffer from significant image quality degradation due to the round-trip 2× down-sampling/2× up-sampling operations.

A number of resizing algorithms have been developed to try to address the loss of image quality that is associated with down-sampling images having fine details.

U.S. Pat. No. 5,995,682 to Pawlicki et al., entitled "Method for resizing of a digital image," discloses a method in which interpolation weights are determined based on local image derivative values, thereby producing images having improved continuity and sharpness characteristics.

U.S. Pat. No. 6,816,166 to Shimizu et al., entitled "Image conversion method, image processing apparatus, and image display apparatus," discloses a method in which a linear interpolation algorithm and a nonlinear interpolation algorithm are applied to an input digital image. Weighting values are determined as a function of the image content for the input digital image, and are used to combine the two interpolated images.

U.S. Pat. No. 6,832,009 to Shezaf et al., entitled "Method and apparatus for improved image interpolation," discloses a method for up-sampling images where an interpolation formula is changed depending on local image gradient values.

U.S. Pat. No. 7,046,390 to Atkins, entitled "System and method for scaling and enhancing color text images," discloses a method for up-sampling text images wherein super-pixels are selected for the output image by applying a template matching algorithm to local image neighborhoods to identify characteristic image patterns.

U.S. Pat. No. 7,149,369 to Atkins, entitled "Method and system image scaling," discloses an image resizing algorithm wherein different interpolation filters are used depending on edge characteristics determined for a local pixel neighborhood.

U.S. Pat. No. 7,200,278 to Long et al., entitled "4×4 pixel-based edge detection and edge enhancement without line buffer overhead," discloses a method for up-sampling images wherein a rotated interpolation filter is used when diagonal edges are detected.

U.S. Patent Application Publication No. 2007/0172152 to Altunbasak et al., entitled "Method and apparatus for adjusting the resolution of a digital image," discloses an image resizing method where interpolation filters are updated based on iteratively applying a classifier to the image pixels.

SUMMARY OF THE INVENTION

The present invention represents a method for resizing an input digital image having input pixel values to produce an output digital image having output pixel values, wherein the output digital image has a lower resolution and wherein single pixel width details in the input digital image are preserved, the method being performed by a processor and comprising:

a) determining an output pixel value for the output digital image by interpolating within a corresponding neighborhood of image pixels in the input digital image;

b) detecting whether the input digital image contains a fine detail within the corresponding neighborhood of image pixels;

c) adjusting the output pixel value when a fine detail is detected; and d) repeating steps a)-c) for a plurality of output pixels.

This invention has the advantage that the appearance of fine details is preserved in down-sampled images.

It has the additional advantage that down-sampled images can be transmitted to a printer across a communication link having a low bandwidth without suffering a significant loss of fine details in prints created from the down-sampled image.

BRIEF DESCRIPTION OF THE DRAWINGS

FIG. 2A shows an example input digital image;

FIG. 2F illustrates a down-sampled image created using a prior art cubic interpolation algorithm;

FIG. 2G illustrates a pixel-replicated image created from the down-sampled image of FIG. 2F;

FIG. 6A illustrates a down-sampled digital image created using one embodiment of the present invention;

FIG. 6B illustrates a pixel-replicated image created from the down-sampled image of FIG. 6A;

FIG. 7A illustrates a down-sampled digital image created using an alternate embodiment of the present invention;

FIG. 7B illustrates a pixel-replicated image created from the down-sampled image of FIG. 7A;

FIG. 8A illustrates a down-sampled digital image created using an alternate embodiment of the present invention; and FIG. 8B illustrates a pixel-replicated image created from the down-sampled image of FIG. 8A.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The phrase, "digital image file", as used herein, refers to any digital image file, such as a digital still image or a digital video file.

Figure 3:
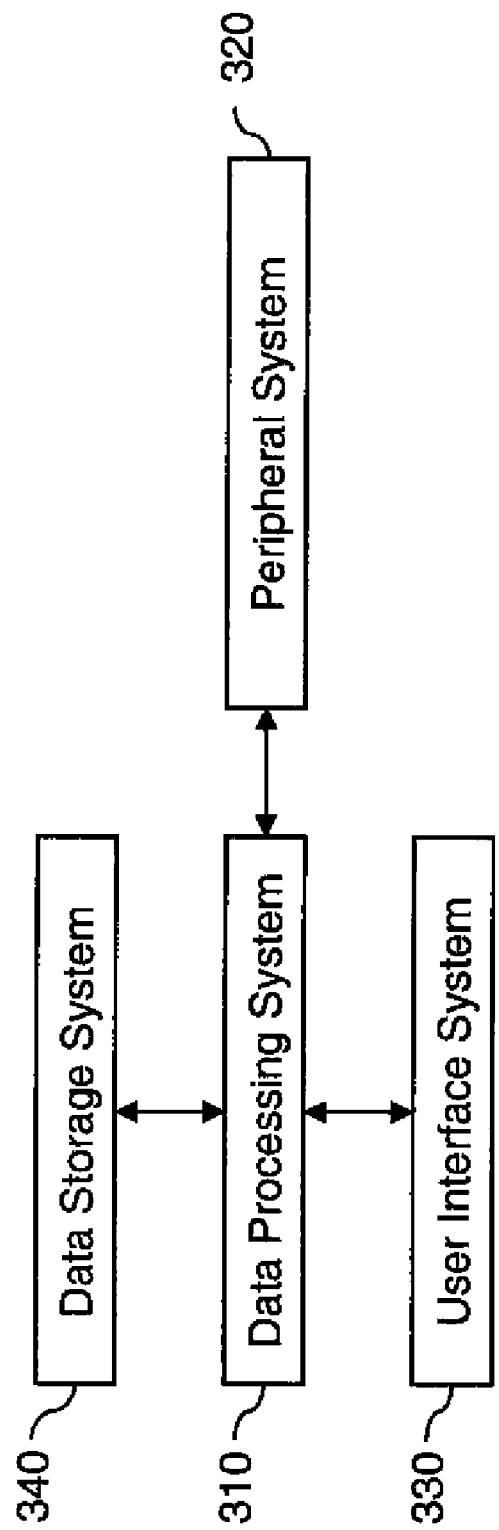
FIG. 3 is high-level diagram showing the components of a system for determining a resized image according to an embodiment of the present invention.

FIG. 3 is a high-level diagram showing the components of a system for resizing an image according to an embodiment of the present invention. The system includes a data processing system 310, a peripheral system 320, a user interface system 330, and a data storage system 340. The peripheral system 320, the user interface system 330 and the data storage system 340 are communicatively connected to the data processing system 310.

The data processing system 310 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 340 includes one or more processor-accessible memories configured to store information, including the information needed to execute the processes of the various embodiments of the present invention, including the example processes described herein. The data storage system 340 may be a distributed processor-accessible memory system including multiple processor-accessible memories communicatively connected to the data processing system 310 via a plurality of computers or devices. On the other hand, the data storage system 340 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 340 is shown separately from the data processing system 310, one skilled in the art will appreciate that the data storage system 340 may be stored completely or partially within the data processing system 310. Further in this regard, although the peripheral system 320 and the user interface system 330 are shown separately from the data processing system 310, one skilled in the art will appreciate that one or both of such systems may be stored completely or partially within the data processing system 310.

The peripheral system 320 may include one or more devices configured to provide digital content records to the data processing system 310. For example, the peripheral system 320 may include digital still cameras, digital video cameras, cellular phones, or other data processors. The data processing system 310, upon receipt of digital content records from a device in the peripheral system 320, may store such digital content records in the data storage system 340.

The user interface system 330 may include a mouse, a keyboard, another computer, or any device or combination of devices from which data is input to the data processing system 310. In this regard, although the peripheral system 320 is shown separately from the user interface system 330, the peripheral system 320 may be included as part of the user interface system 330.

The user interface system 330 also may include a display device, a processor-accessible memory, or any device or combination of devices to which data is output by the data processing system 310. In this regard, if the user interface system 330 includes a processor-accessible memory, such memory may be part of the data storage system 340 even though the user interface system 330 and the data storage system 340 are shown separately in FIG. 3.

The present invention will now be described with reference to FIG. 4. An interpolation step 402 is used to determine an output pixel value 404 from a corresponding pixel neighborhood of an input digital image 400. The interpolation step 402 can use any interpolation method known to those skilled in the art. In a preferred embodiment of the present invention, the interpolation step 402 utilizes the well-known one-dimensional cubic interpolation algorithm to first down-sample the rows of the input digital image 400. The cubic interpolation algorithm is then applied a second time to down-sample the image columns.

Figure 5:
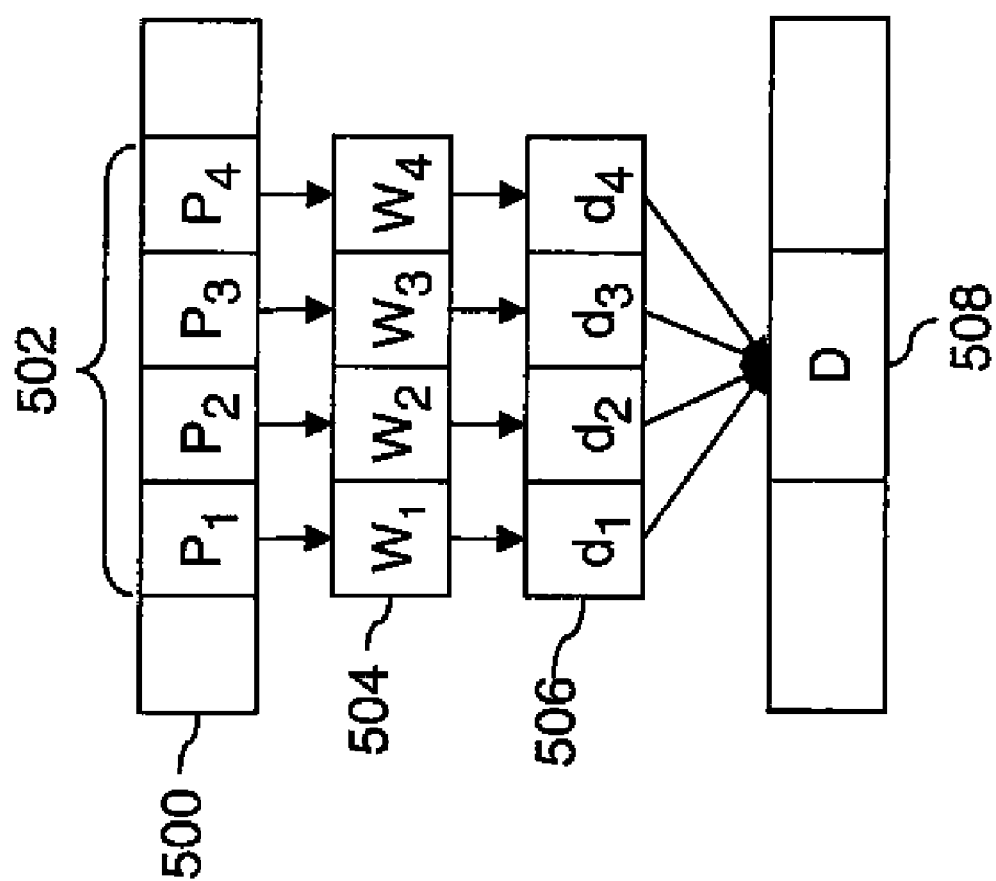
FIG. 5 illustrates a cubic interpolation algorithm that can be used in accordance with the present invention.

FIG. 5 illustrates how a cubic interpolation algorithm can be used to process a row of input image pixels 500. To compute an output pixel value 508 (D), a corresponding pixel neighborhood 502 from the row of input image pixels 500 is identified. In this example, the pixel neighborhood 502 comprises 4 pixels having pixel values $P_i$. A set of weighting factors 504 ($W_i$) is then used to scale the pixel values to determine weighted pixel values 506 ($d_i = W_i \times P_i$). Finally, the weighted pixel values 506 are summed to determine the output pixel value 508. This can be represented in equation form as:

$$D = \sum_{i=1}^{4} W_i P_i. \quad (1)$$

The exact values of the weights will vary depending on the down-sampling factor. For a 2× down-sampling factor, weighting factors of $W_1 = W_4 = 0.17$ and $W_2 = W_3 = 0.33$ can be used.

Figure 4:
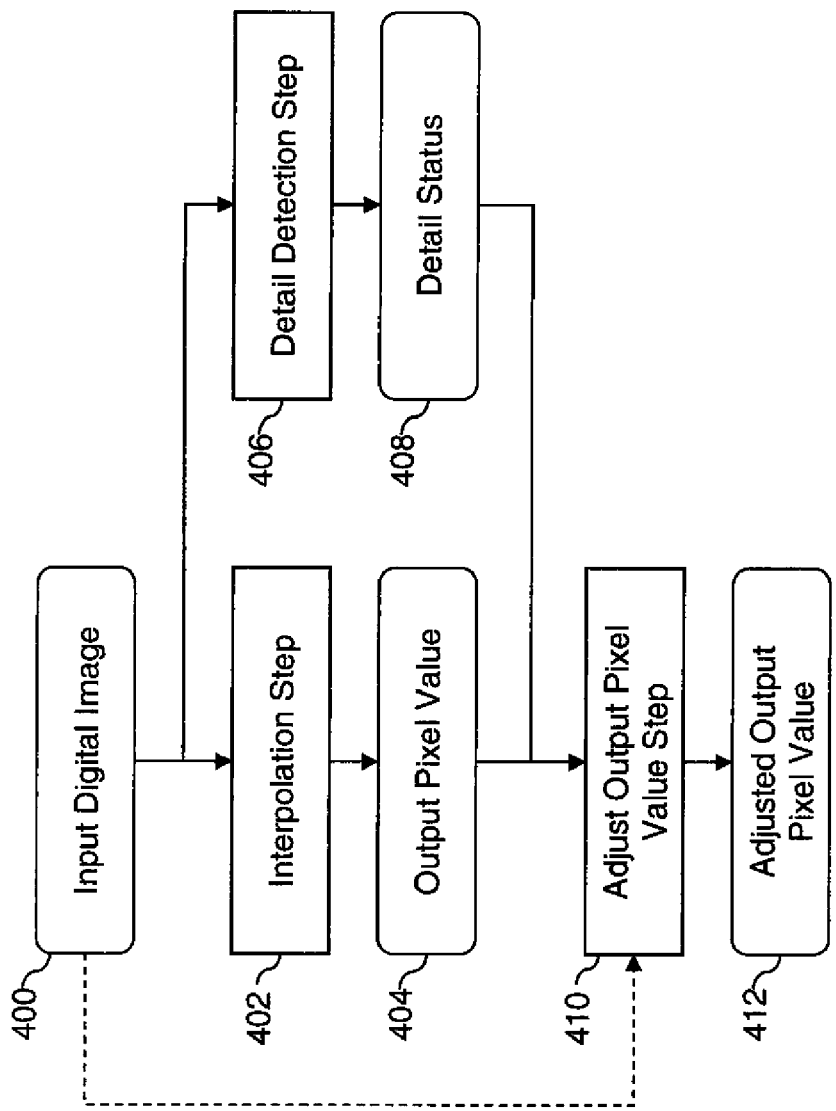
FIG. 4 is a flow chart illustrating the method of the present invention.

Returning now to a discussion of FIG. 4, in alternate embodiments of the present invention other interpolation algorithms can be used by the interpolation step 402. Examples of well known interpolation algorithms would include bicubic and bilinear interpolation algorithms.

Next, a detail detection step 406 is used to analyze the input digital image to determine a detail status 408, which is an indication of whether the corresponding pixel neighborhood in the input digital image 400 contains fine details. The detail detection step 406 can use any method known to one skilled in the art to detect image details.

In a preferred embodiment of the present invention the fine details are single pixel width details, and the single pixel width details are detected by determining whether an input pixel value differs by more than a specified threshold from the input pixel values of adjacent input pixels within the neighborhood of input pixels. With respect to the pixel neighborhood 502 of FIG. 5, one means for detecting single pixel width details is to use the following test:

$$DetailStatus = \begin{cases} TRUE; & (((P1-P2)>T) \text{ AND } ((P3-P2)>T)) \text{ OR } (((P2-P3)>T) \text{ AND } ((P4-P3)>T)) \\ FALSE; & \text{Otherwise} \end{cases} \quad (2)$$

where T is a threshold value, AND is a logical "and" operation, OR is a logical "or" operation and DetailStatus is a variable representing the detail status 408. It can be seen that the effect of this test is to identify cases where either the P2 or the P3 input pixel value is darker than both of its immediate neighbors by more than the threshold value. In this way, pixel neighborhoods containing single pixel width dark vertical details (e.g., vertical lines) on a light background are identified.

In an alternate embodiment of the present invention, an absolute value operation can be applied to the pixel differences in Eq. (2) before they are compared to the threshold value:

$$DetailStatus = \begin{cases} TRUE; & ((|P1-P2|>T) \text{ AND } (|P3-P2|>T)) \text{ OR } ((|P2-P3|>T) \text{ AND } (|P4-P3|>T)) \\ FALSE; & \text{Otherwise} \end{cases} \quad (3)$$

In this way, the detail detection step 406 can detect both dark details on a light background and light details on a dark background.

The test shown in Eq. (2) can be repeated for a vertically oriented pixel neighborhood to identify single pixel width horizontal details (e.g., horizontal lines). In one embodiment of the present invention, the detail status 408 is a Boolean value which is set to TRUE if either a vertical or horizontal single pixel width detail is detected, and is set to FALSE otherwise. In other embodiments, it is desirable to distinguish between vertical and horizontal details. In this case, the value of the detail status 408 can be an integer value which is given different values depending on the type of fine detail detected. For example: a value of "0" can indicate that no fine details were detected; a value of "1" can indicate that a vertical detail was detected; a value of "2" can indicate that a horizontal detail was detected; and a value of "3" can indicate that both vertical and horizontal details were detected (e.g., due to a diagonal line or an isolated dot).

In alternate embodiments of the present invention, other types of detail detection algorithms can be used by the detail detection step 406. Examples of detail detection algorithms that are well-known in the art would include Canny edge detectors and gradient-based edge detectors.

Next, an adjust output pixel value step 410 is used to adjust the output pixel value 404 responsive to the detail status 408 producing an adjusted output pixel value 412. In one embodiment of the present invention, the adjusted output pixel value 412 is determined by adding or subtracting a specified incremental value to/from the output pixel value 404 for pixels where the detail status 408 indicates that the input digital image 400 contains a fine detail. This can be represented in equation form by:

$$D_A = \begin{cases} D; & DetailStatus = FALSE \\ D - \Delta D; & DetailStatus = TRUE \end{cases} \quad (4)$$

where $D_A$ is the adjusted output pixel value 412 and $\Delta D$ is the incremental value.

The incremental value $\Delta D$ used for a particular implementation can be empirically determined. The optimal value will generally be a function of the interpolation method and the resolution difference between the input digital image and the output digital image. When the resized image is adapted to be printed on a digital printer, the optimal value of the incremental value $\Delta D$ may also be a function of the characteristics of the digital printer. For the case where cubic interpolation is used to reduce the resolution of the output digital image to half that of the input digital image, incremental values in the range of 65 to 150 have been found to produce good results for images to be printed on an inkjet printer.

Figure 2C:
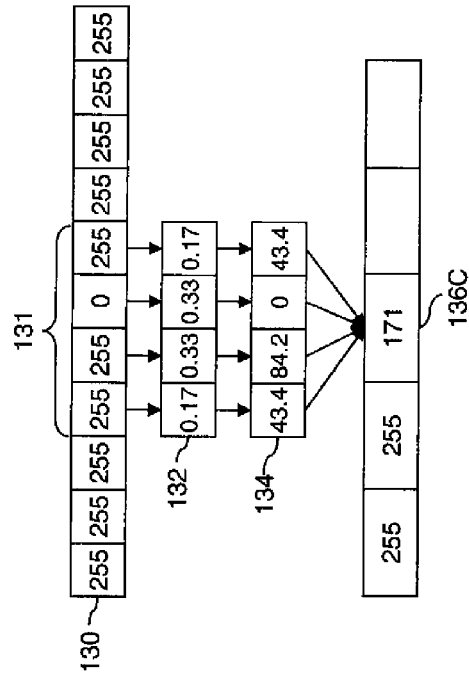
FIGS. 2B, 2C, 2D and 2E illustrate computing interpolated pixel values using a prior art cubic interpolation algorithm.
Figure 2E:
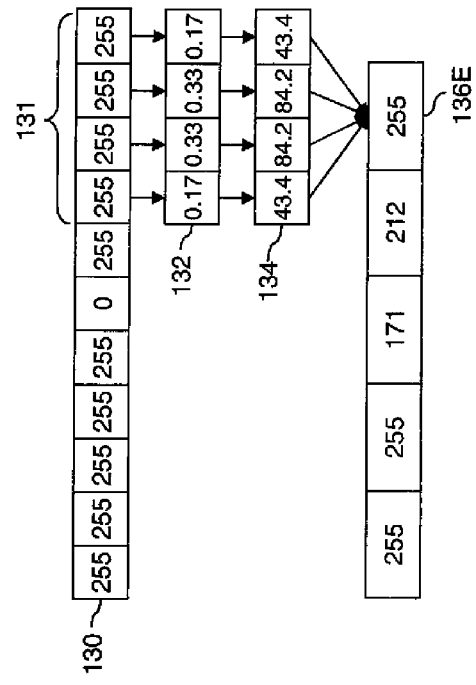
Figure 2B:
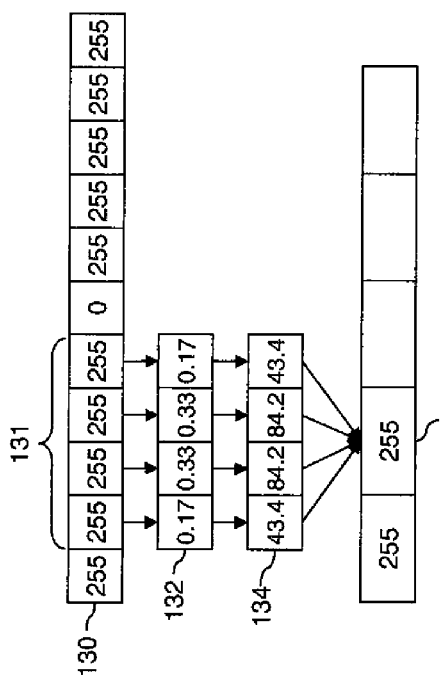
Figure 2D:
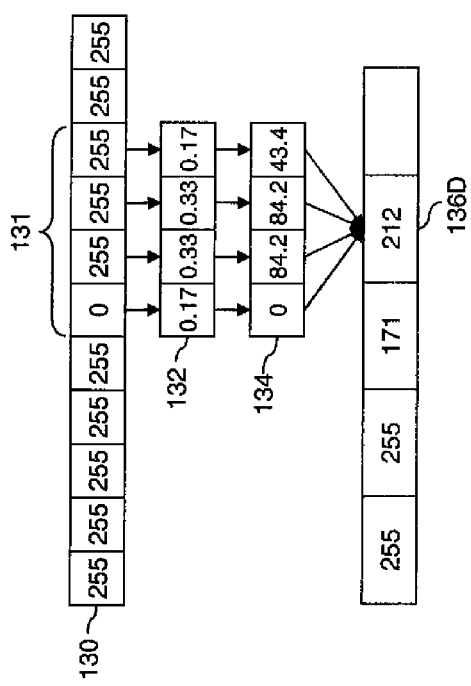
Figures 2F, 2G:
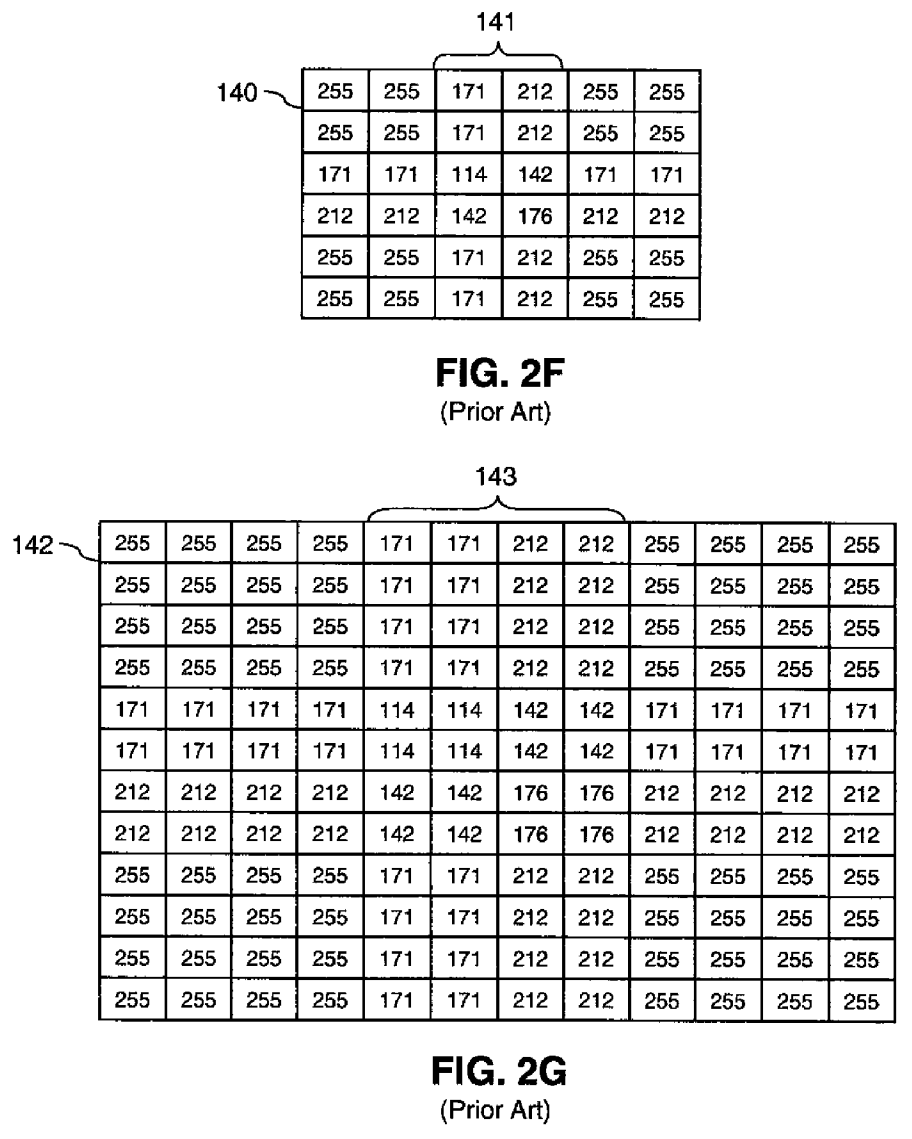
Figures 6A, 6B:
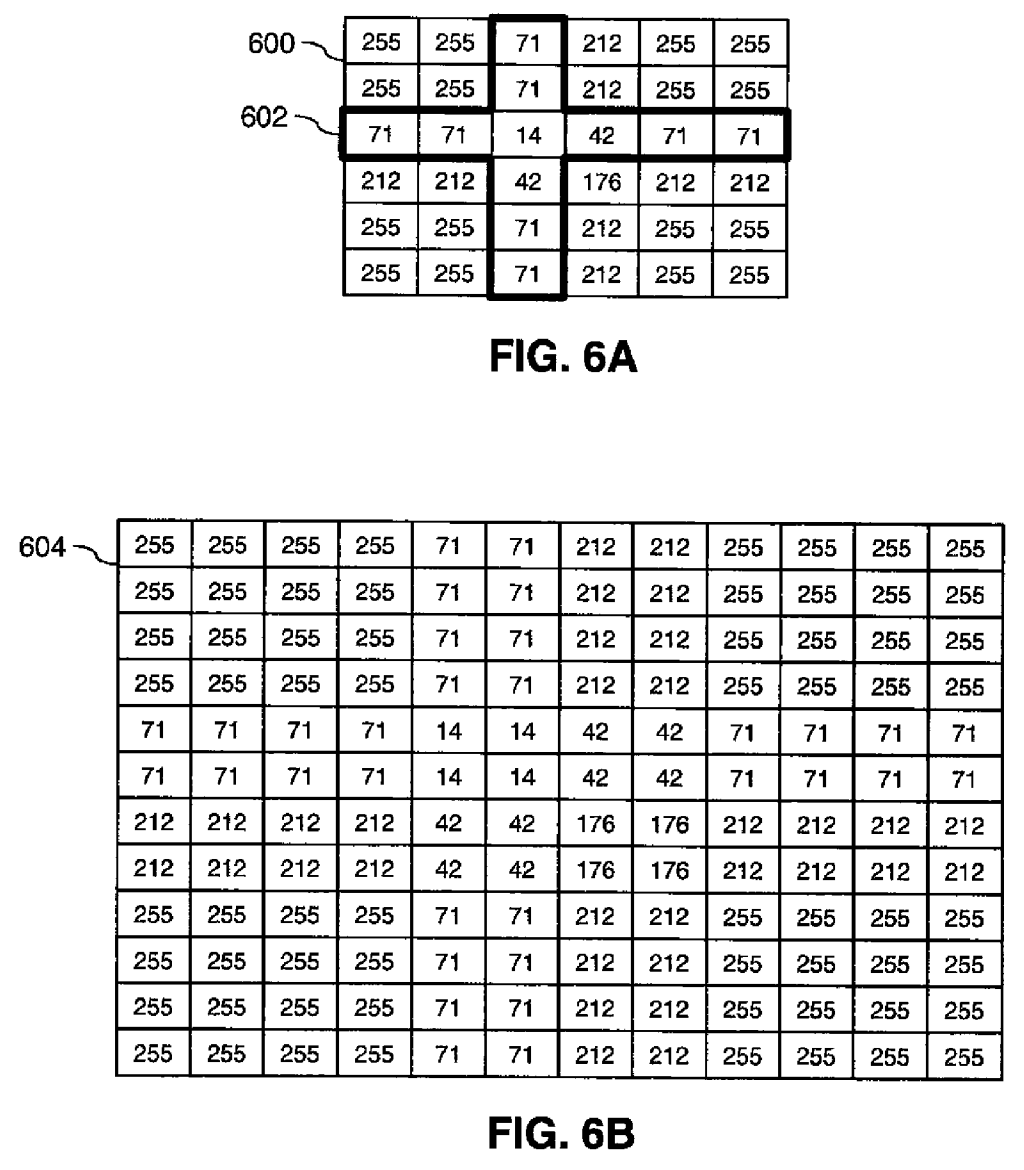

As discussed earlier, in one embodiment of the present invention the interpolation process is implemented by two successive one-dimensional interpolation steps. In this case, the adjust output pixel value step 410 can be applied once after both of the horizontal and vertical interpolation steps have been applied. FIG. 6A illustrates a down-sampled digital image 600 determined by using this approach to apply the method of the present invention to the input digital image 120 (FIG. 2A). In this case, an incremental value of $\Delta D=100$ was subtracted from the output pixel values 404 for each of the detail pixels 602 within the bold outline region.

In an alternate embodiment of the present invention, the adjust output pixel value step 410 can be applied after each of the successive interpolation steps. In this case, it may be desirable to use different incremental values $\Delta D$ following the horizontal and vertical interpolation steps. For example, if a vertical detail is detected the output pixel value 404 can be adjusted by an incremental value of $\Delta D_V$ following the horizontal interpolation step, and if a horizontal detail is detected the output pixel value 404 can be adjusted by an incremental value of $\Delta D_H$ following the vertical interpolation step.

In yet another embodiment of the present invention, the adjust output pixel value step 410 is applied only after the first interpolation step. In this case, it may be desirable to used different incremental values $\Delta D$ depending on whether horizontal or vertical details are detected. FIG. 7A illustrates a down-sampled digital image 700 determined by using this approach to apply the method of the present invention to the input digital image 120 (FIG. 2A). In this case, an incremental value of $\Delta D_H=150$ was subtracted from the output pixel values 404 following the first interpolation step when horizontal details were detected and a value of $\Delta D_V=65$ was subtracted from the output pixel values 404 following the first interpolation step when vertical details were detected. The output pixels that were affected by the adjust output pixels value step 410 are detail pixels 702 shown within the bold outline region. One reason that a larger incremental value is used for horizontal details is that the subsequent vertical interpolation step will result in and additional loss of contrast for the horizontal details, whereas the contrast of the vertical details will remain largely unchanged.

For the case where the detail detection step 406 detects both light and dark details (e.g., using Eq. (3)), the incremental value $\Delta D$ would be subtracted for dark details (assuming that 0 is dark and 255 is light), and would be added for light details.

After the incremental value $\Delta D$ is added or subtracted from the output pixel value 404, the adjusted output pixel value 412 should be checked to make sure it is within a specified valid range (e.g., 0 to 255 for 8-bit pixel values). For cases where the adjusted output pixel value 412 exceeds this range, it should be constrained accordingly.

In an alternate embodiment of the present invention, the adjust output pixel value step 410 can adjust the output pixel value 404 by setting it equal to an input pixel value of the detected fine detail. For example, if a single pixel width detail having a particular code value (e.g., 0 for a black line) is detected, the adjusted output pixel value 412 can be set to be equal to that same value in order to preserve the density of the fine detail. FIG. 8A illustrates a down-sampled digital image 800 determined by using this approach to apply the method of the present invention to the input digital image 120 (FIG. 2A). In this case, the output pixel values 404 for each of the detail pixels 802 within the bold outline region were set to be equal to the corresponding input pixel values in the input digital image 120.

In a preferred embodiment of the present invention, the input digital image is a color digital image having a plurality of color channels (e.g., RGB or CMYK). In one implementation, each of the color channels is processed independently. In this manner, fine details may exist and be adjusted in one color channel, but no adjustment may be applied to the corresponding pixels in the other color channels.

In an alternate embodiment, fine details are detected by analyzing the color digital image, and then the output pixel values for all of the color channels are adjusted if a fine detail is detected in the color digital image. In one arrangement, a fine detail is detected in the color digital image by analyzing each of the color channels independently. If any one of the color channels is found to contain a fine detail, the color digital image is said to have a fine detail at that location. In another arrangement, a plurality of the color channels of the color digital image can be processed together to detect fine details. For example, a luminance image can be determined by computing a weighted combination of the color channels of the color digital image; fine details in the color digital image can then be detected by analyzing the resulting luminance image.

Figure 1:
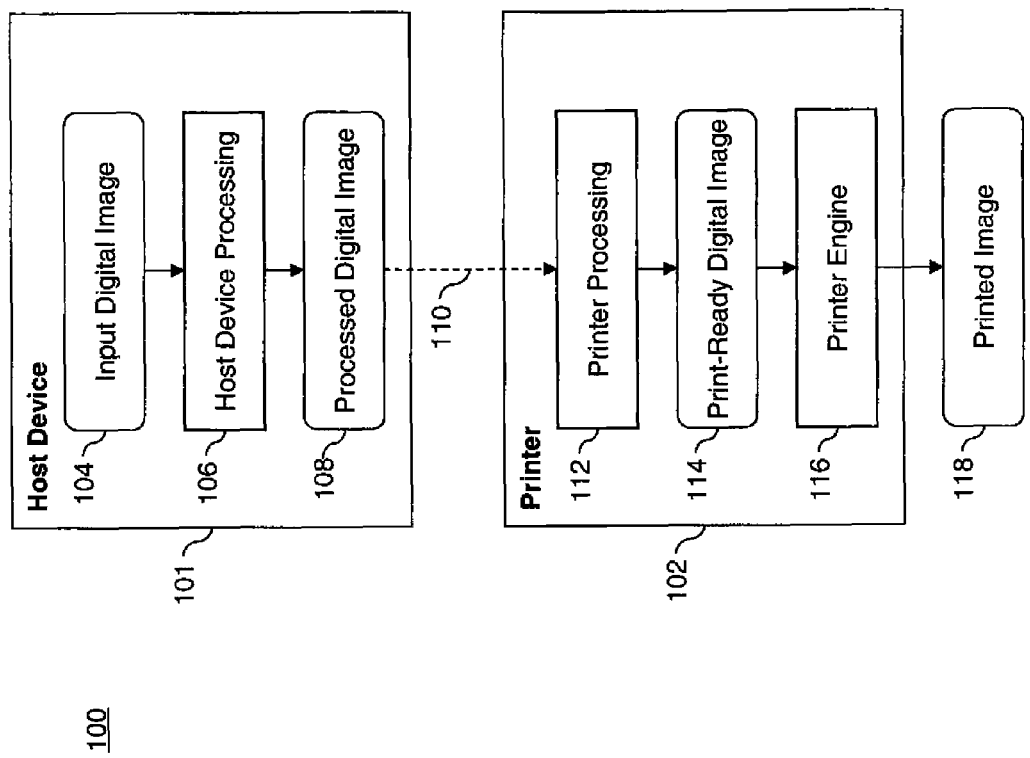
FIG. 1 illustrates a prior art system for printing images.

In one embodiment of the present invention, the image resizing process is applied as part of a system for printing images, such as that shown in FIG. 1. For example, the image resizing operation can be applied in the host device processing 106 to produce a lower resolution processed digital image 108 for transmission to the printer across the communication link 110 for printing on a printer 102, such as an inkjet printer. Transmitting a lower resolution image across the communication link 110 has the advantage that a smaller data bandwidth is required. This can be particularly significant when communication links 110 having a limited bandwidth are used (e.g., wireless communication links).

Often, it may be desirable for the printer processing 112 to apply a second resizing process to resize the output digital image to a printer resolution before it is printed. The second resizing process can use any resizing method known to one skilled in the art. In one embodiment of the present invention, this second resizing process uses a nearest neighbor interpolation algorithm. FIGS. 6B, 7B and 8B show pixel-replicated digital images corresponding to the down-sampled digital images shown in FIGS. 6A, 7A and 8A, respectively. In this case the pixel-replicated digital images have a resolution 2× the resolution of the down-sampled digital images. It can be seen that the improved density of the fine details has been preserved through the second resizing process.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST

100 System
101 Host device
102 Printer
104 Input digital image
106 Host device processing
108 Processed digital image
110 Communication link
112 Printer processing
114 Print-ready digital image
116 Printer engine
118 Printed image
120 Input digital image
122 White pixel
124 Black pixel
130 Row of input image pixels
131 Pixel neighborhood
132 Weighting factors
134 Weighted pixel values
136B Output pixel value
136C Output pixel value
136D Output pixel value
136E Output pixel value
140 Down-sampled digital image
141 Down-sampled line pixels
142 Pixel-replicated digital image
143 Pixel-replicated line pixels
310 Data processing system
320 Peripheral system
330 User interface system
340 Data storage system
400 Input digital image
402 Interpolation step
404 Output pixel value
406 Detail detection step 408 Detail status
410 Adjust output pixel value step
412 Adjusted output pixel value
500 Row of input image pixels
502 Pixel neighborhood
504 Weighting factors
506 Weighted pixel values
508 Output pixel value
600 Down-sampled digital image
602 Detail pixels
604 Pixel-replicated digital image
700 Down-sampled digital image
702 Detail pixels
704 Pixel-replicated digital image
800 Down-sampled digital image
802 Detail pixels
804 Pixel-replicated digital image

The invention claimed is:

1. A method for resizing an input digital image having input pixel values to produce an output digital image having output pixel values, wherein the output digital image has a lower resolution and wherein single pixel width details in the input digital image are preserved, the method being performed by a processor and comprising:
   a) determining an output pixel value for the output digital image by interpolating within a corresponding neighborhood of image pixels in the input digital image;
   b) analyzing the input digital image using a fine detail detection process to determine a detail status value that indicates whether the input digital image contains a fine detail within the corresponding neighborhood of image pixels;
   c) adjusting the output pixel value when the detail status value indicates that the corresponding neighborhood of image pixels contains a fine detail; and
   d) repeating steps a)-c) for a plurality of output pixels.

2. The method of claim 1 wherein the output pixel value is determined using a one-dimensional interpolation process.

3. The method of claim 2 wherein the one-dimensional interpolation process is a linear interpolation process or a cubic interpolation process.

4. The method of claim 1 wherein the output pixel value is determined using successive horizontal and vertical one-dimensional interpolation processes.

5. The method of claim 4 wherein the one-dimensional interpolation processes are linear interpolation processes or cubic interpolation processes.

6. The method of claim 1 wherein the output pixel value is determined using a bicubic interpolation process or a bilinear interpolation process.

7. The method of claim 1 wherein the fine detail is a single pixel width detail.

8. The method of claim 7 wherein single pixel width details are detected by determining whether an input pixel value differs by more than a specified threshold from the input pixel values of adjacent input pixels within the neighborhood of input pixels.

9. The method of claim 8 wherein the adjacent input pixels are the pixels to the left and the right of the input pixel or the pixels above and below the input pixels.

10. The method of claim 1 wherein the output pixel value is adjusted by adding or subtracting a specified value from the output pixel value.

11. The method of claim 10 wherein a different specified value is added or subtracted for resizing in the horizontal direction than for resizing in the vertical direction.

12. The method of claim 10 wherein the adjusted output pixel value is constrained to fall within a specified range.

13. The method of claim 1 wherein the output pixel value is adjusted by setting it equal to an input pixel value of the detected fine detail.

14. The method of claim 1 further including the step of printing the output digital image.

15. The method of claim 14 wherein the output digital image is printed on an inkjet printer.

16. The method of claim 14 wherein a second resizing process is used to resize the output digital image to a printer resolution before it is printed.

17. The method of claim 1 further including the step of transmitting the output digital image to a digital printer using a communications link.

18. The method of claim 17 wherein the communications link is a wireless communications link.

19. The method of claim 1 wherein the input digital image is a color digital image having a plurality of color channels, and where each of the color channels is processed independently.

20. The method of claim 1 wherein the input digital image is a color digital image having a plurality of color channels, and wherein fine details are detected using a plurality of the color channels of the color digital image.

21. The method of claim 20 wherein fine details are detected by analyzing a luminance image determined using a weighted combination of the color channels of the color digital image.

22. The method of claim 1 wherein the input digital image is a color digital image having a plurality of color channels, and wherein the output pixel values for all of the color channels are adjusted if a fine detail is detected in any one of the color channels.

23. A system comprising:
   a data processing system; and
   a memory system communicatively connected to the data processing system and storing instructions configured to cause the data processing system to implement a method for resizing an input digital image having input pixel values to produce an output digital image having output pixel values, wherein the output digital image has a lower resolution and wherein single pixel width details in the input digital image are preserved, wherein the instructions comprise:
   a) determining an output pixel value for the output digital image by interpolating within a corresponding neighborhood of image pixels in the input digital image;
   b) analyzing the input digital image using a fine detail detection process to determine a detail status value that indicates whether the input digital image contains a fine detail within the corresponding neighborhood of image pixels;
   c) adjusting the output pixel value when the detail status value indicates that the corresponding neighborhood of image pixels contains a fine detail; and
   d) repeating steps a)-c) for a plurality of output pixels.

24. The system of claim 23 further including a printing device for printing the output digital image.

* * * * *